United States Patent Office
3,657,220
Patented Apr. 18, 1972

1

3,657,220
SULFO-CONTAINING PHENYL-AZO-PHENYL DYESTUFF COMPOUNDS
Lindsay Kilmurry, Pennsville, N.J., assignor to E. I. du Pont de Nemours and Company, Wilmington, Del.
No Drawing. Filed Dec. 31, 1969, Ser. No. 889,677
Int. Cl. C07c 107/06; C09b 29/06, 29/26
U.S. Cl. 260—207
3 Claims

ABSTRACT OF THE DISCLOSURE

Orange to red monoazo acid dyes, useful for dyeing synthetic polyamide fibers under neutral to weakly acidic conditions, having the formula

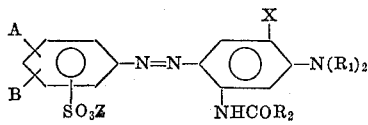

wherein A is H, Cl, methyl, methoxy, NHCOalkyl, NHCOphenyl or NHCOphenyl containing one substituent selected from methyl, methoxy and Cl;
B is H, Cl or methyl;
Z is H or a monovalent alkali metal, ammonium or substituted ammonium cation;
X is H or alkoxy;
$R_1$ is alkyl; and
$R_2$ is alkyl, phenyl or phenyl containing one substituent selected from methyl, methoxy and Cl; said alkyl and alkoxy groups containing one to four carbon atoms.

BACKGROUND OF THE INVENTION

(1) Field of the invention

This invention relates to monoazo dyes having good exhaust and transfer properties on synthetic polyamides under neutral to weakly acidic dyeing conditions.

(2) Description of the prior art

The dyeing of synthetic polyamide (nylon) fibers is effected almost entirely by three classes of dyes, namely, acid, disperse and premetallized dyes. The choice of dye class depends on the end-use to which the nylon substrate is put.

Premetallized dyes exhibit poor transfer (the ability to move from one site to another on the substrate during the dyeing process) on nylon and hence tend to produce unlevel shades, particularly if there are any irregularities in the yarn. For BCF nylon carpeting, which is dyed in widths up to 15 feet, levelness of shade (and thus good transfer) is critically important. Disperse dyes exhibit the best transfer of the three dye classes and consequently produce the most level dyeings.

For many important end-uses, notably the dyeing of BCF (bulked continuous filament) nylon carpeting, acid dyes have the most desirable combination of properties. For example, acid dyes tend to have better fastness towards gaseous atmospheric contaminants such as nitrogen oxides and ozone, better wet-fastness and brighter shades than disperse dyes. However, levelness is often a problem with acid dyes because they vary greatly in their ability to exhaust and to transfer on nylon. Exhaust and transfer are dependent on the acidity of the dyebath, exhaust improving at the expense of transfer as the acidity increases. Generally, acid dyes are applied to nylon at a pH of about 3 in order to obtain efficient exhaust of the dye onto the substrate. However, in certain important end-uses, including BCF nylon carpeting, there are several reasons why a higher dyeing pH is preferred:

(1) Good transfer is essential to obtain the desired levelness of shade.

(2) Much BCF nylon carpeting is backed with jute which contains impurities which stain the nylon under the more acidic conditions. Such stains have an adverse effect on dye shade and fastness properties and may also promote unlevelness of shade. Staining by the jute backing is virtually eliminated under neutral to weakly acidic conditions (pH 6–7).

(3) BCF nylon styling yarns, which are being increasingly used in carpeting but which find application in other areas such as upholstery, usually contain an acid-modified type of nylon which is dyed with basic dyes, and in addition, two or more unmodified types of nylon which are dyeable with acid dyes. Additives are currently available which make it possible to dye such materials from a single dyebath containing both acid and basic dyes. However, the exhaust of basic dyes on acid-modified synthetic fibers decreases with increasing dyebath acidity. On the other hand, staining of the unmodified fibers by the cationic dyes becomes apparent as the dyebath pH approaches neutrality and is unacceptably heavy under alkaline conditions. Such staining reduces the shade contrast between the modified and unmodified yarns.

Because of these various considerations, acid dyes which can be applied to nylon under neutral to weakly acidic conditions (pH 6–7) are a desirable commodity. Very few acid dyes have the necessary exhaust and transfer properties at this pH range, even with the help of leveling agents; fewer yet combine such application properties with the high degree of fastness required for such end-uses as nylon carpeting.

OBJECTS AND SUMMARY OF THE INVENTION

It is an objective of this invention to provide orange to red dyes which have good exhaust and transfer on BCF nylon under neutral to weakly acidic conditions. It is a further objective to provide dyes which have a fair to excellent degree of light and chemical fastness on BCF nylon. It is a still further objective to provide dyes which have unusually bright shades on nylon.

The present invention resides in dyes having the formula

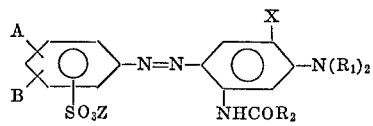

wherein A is H, Cl, methyl, methoxy, NHCOalkyl, NHCOphenyl or NHCOphenyl containing one substituent selected from methyl, methoxy and Cl;
B is H, Cl or methyl;
Z is H or a monovalent alkali metal, ammonium or substituted ammonium cation;
X is H or alkoxy;
$R_1$ is alkyl; and
$R_2$ is alkyl, phenyl or phenyl containing one substituent selected from methyl, methoxy and Cl; said alkyl and alkoxy groups containing one to four carbon atoms.

DETAILED DESCRIPTION OF THE INVENTION

The present invention resides in bright, level-dyeing, orange to red, monoazo acid dyes having the formula given above. Preferred dyestuffs of this invention include those wherein $R_2$ is phenyl or substituted phenyl as defined above. The preferred dyestuffs are

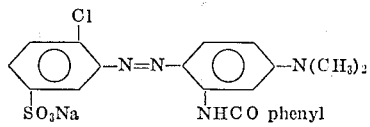

and

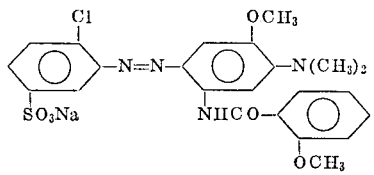

The dyes of this invention are prepared by diazotizing an amine having the formula

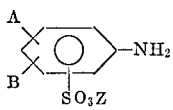

and coupling the resulting diazo compound to an equimolar quantity of an amine having the formula

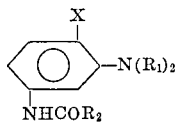

all symbols being as previously defined. All reactions are carried out by well known prior art procedures.

Diazotization of the sulfonated amines can be effected by adding sodium nitrite to a slurry of the amine in dilute mineral acid (preferably hydrochloric acid) at 0°–25° C. (preferably 10°–20° C.). Alternatively, an alkaline solution of the amine and sodium nitrite in water can be added slowly to dilute mineral acid at about 0°–25° C. After maintaining an excess of nitrous acid for a sufficient length of time to ensure complete reaction, the excess is destroyed with a suitable reagent such as sulfamic acid before proceeding with the coupling reaction. Examples of amines that can be employed in the diazotization reaction are given in Table 1.

TABLE 1 orthanilic acid
metanilic acid
sulfanilic acid
2-chloroaniline-4-sulfonic acid
2-chloroaniline-5-sulfonic acid
4-chloroaniline-2-sulfonic acid
4-chloroaniline-3-sulfonic acid
2-anisidine-5-sulfonic acid
p-toluidine-2-sulfonic acid
p-toluidine-3-sulfonic acid
o-toluidine-4-sulfonic acid
2,4-xylidine-6-sulfonic acid
2,5-dichloroaniline-4-sulfonic acid
2,6-dichloroaniline-4-sulfonic acid
3-amino-5-chloro-o-toluenesulfonic acid
5-amino-4-chloro-o-toluenesulfonic acid
2-amino-4-chloro-m-toluenesulfonic acid
6-amino-4-chloro-m-toluenesulfonic acid
2-amino-5-chloro-p-toluenesulfonic acid
4'-aminobenzanilide-3'-sulfonic acid
4-aminovaleranilide-3-sulfonic acid
4'-amino-2-chlorobenzanilide-3'-sulfonic acid
4'-amino-4-methylbenzanilide-3'-sulfonic acid
4'-amino-3-methoxybenzanilide-3'-sulfonic acid The diazo preparation can be added to a stirred slurry or solution of the coupling component in dilute mineral acid and/or an organic solvent such as acetic acid or ethanol at about 0°–20° C. Alternatively, a slurry or solution of the coupler can be added to the diazo preparation. In order to increase the reaction rate, it is advantageous to raise the pH of the reaction mass to about 3 with a base or salt, such as sodium hydroxide or sodium acetate. If desired, other cations such as lithium, potassium or ammonium can be introduced by adding salts or bases of these radicals to adjust the pH of the reaction mixture.

When the reaction is complete, the product is isolated by filtration and purified, if desired, by washing, reslurrying or recrystallizing from a suitable solvent system.

If a pure form of the dye containing a cation other than sodium is desired, the dye is best isolated as the free sulfonic acid by first making the reaction mass highly acidic with mineral acid. The solids are separated by filtration, washed thoroughly in water to remove inorganic salts, reslurried in water and treated with the carbonate or hydroxide of the desired cation, such as lithium, potassium or ammonium. Alternatively, an organic amine can be used to neutralize the free acid form of the dye in place of the inorganic reagents mentioned. Examples of amines include alkylamines, such as triethylamine, propylamine, butylamine, N-methylpropylamine, N-methylbutylamine and dibutylamine. Alkanolamines can also be used, such as ethanolamine, N,N-dimethylethanolamine, N,N-diethylethanolamine, N-methyl- or N-ethyldiethanolamine, triethanolamine and diisopropanolamine. Mixtures of amines can also be used if desired.

Examples of coupling components that can be used in conjunction with the amines of Table 1 to give useful dyes for nylon are given in Table 2. The symbols are as previously defined.

TABLE 2

| X | $R_1$ | $R_2$ |
|---|---|---|
| H | $CH_3$ | $C_6H_5$ |
| H | $C_4H_9$ | $C_6H_5$ |
| H | $CH_3$ | $CH_3$ |
| $OCH_3$ | $CH_3$ | $C_4H_9$ |
| $OC_2H_5$ | $CH_3$ | $C_6H_5$ |
| $OCH_3$ | $CH_3$ | ![phenyl-OCH_3] |
| $OC_4H_9$ | $CH_3$ | Same as above. |
| H | $C_2H_5$ | ![phenyl-Cl] |
| $OCH_3$ | $C_2H_5$ | ![phenyl-CH_3] |

The dyes of this invention combine a brightness of shade, levelness of shade on nylon, and fair to excellent resistance to light and chemical fading. While such a combination of properties makes these dyes particularly useful for application to BCF nylon carpeting, their utility is by no means confined thereto. Nylon fibers are used in many ways, notably in apparel, upholstery, hosiery, parachute fabric and so on. The instant dyes can be used to advantage in such end-uses, particularly where brightness of shade is a desirable feature. Where fastness to washing is required, it may be necessary to aftertreat the dyed material with known agents such as tannin to improve this property. A variety of nylon substrates can be dyed with the above-described dyes, such as poly(hexamethylene adipamide), poly(hexamethylene sebacamide), polyl(m-xylene adipamide), poly(xylylene sebacamide), polycaprolactam and the like. Poly(hexamethylene adipamide) is the preferred substrate.

The subject dyes can be applied to the nylon substrate by aqueous or pad-steam procedures. Included in the latter type are printing and continuous dyeing procedures.

The following examples illustrate typical procedures for preparing and using the dyes. All parts are given by weight.

EXAMPLE 1

Coupling of 4-chlorometanilic acid to m-benzamido-N,N-dimethylaniline

A solution of 6.9 parts of 4-chlorometanilic acid and 3.0 parts of sodium bicarbonate in 60 parts of water was treated with 11.6 parts of 10 N-hydrochloric acid. The resulting slurry was cooled to 10° C. with ice and 9.8 parts of 5 N-sodium nitrite solution were added over a 15 minute period. An excess of nitrous acid was maintained at 10° C. for 1 hour, after which it was destroyed with sulfamic acid.

The diazo preparation was added over a ½ hour period to a slurry of 8.0 parts of m-benzamido-N,N-dimethylaniline in 80 parts of ethanol at 10° C. After stirring the reaction mass for 1 hour, the pH was adjusted to 3.5 with 30% caustic soda solution. Stirring was continued for 1 hour, by which time all the diazonium salt has been consumed. The pH was adjusted to 4.2 with 30% caustic soda and the product was isolated by filtration. Yield of dried product: 16.6 parts.

Thin layer chromatography (using butanol acetic acid 1:1) indicated one colored (orange) component. The dye had a maximum absorptivity of 61.5 liters/gram/cm. at 480 m$\mu$ (in dimethyl formamide).

A sample of the dye was recrystallized from ethanol and analyzed for its elements.

Analysis.—Calcd. for $C_{21}H_{18}O_4SN_4$–ClNa (percent): C, 52.2; H, 3.75; N, 11.6 (5.8 azo); S, 6.7; Cl, 7.4. Found (percent): C, 50.0; H, 4.3; N, 11.1 (5.8 azo); S, 6.5; Cl, 7.1.

Based on the above, the dye has the formula

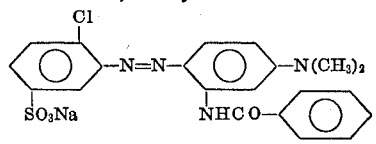

Bright orange shades of excellent levelness and fastness to light are produced when BCF nylon is dyed with this dye by the procedure described in Example 16.

EXAMPLE 2

Coupling of 4-chlorometanilic acid to 2-methoxy-5-(2-methoxybenzamido)-N,N-dimethylaniline To a stirred slurry of 10.4 parts of 4-chlorometanilic acid in 100 parts of water and 23 parts of 10 N-hyldrochloric acid was added 12.8 parts of 5-N-sodium nitrile solution. An excess of nitrous acid was maintained for 30 minutes, after which it was destroyed with sulfamic acid.

The diazo preparation was added to a solution of 15 parts of 2 - methoxy-5-(2-methoxybenzamido)-N,N-dimethylaniline in 115 parts of acetic acid. The pH adjusted to 3.5 with 30% caustic soda solution. After stirring for 2 hours, the product was isolated by filtration, washed with 5% sodium chloride solution to remove residual acetic acid and dried. Yield: 17.4 parts.

Thin layer chromatography indicated one colored (red) component. The dye had a maximum absorptivity of 34.0 liters/gram/cm. at 490 m$\mu$ (in dimethyl formamide).

A sample of the dye was recrystallized from ethanol and analyzed for its elements.

Analysis.—Calcd. for $C_{23}H_{22}O_6SN_4$–ClNa (percent): C, 50.3; H, 4.1; N, 10.2 (5.1 azo); S, 5.9; Cl, 6.5. Found (percent): C, 49.5; H, 4.5; N, 10.0 (5.3 azo); S, 5.8; Cl, 6.1.

Based on the above, the dye has the formula

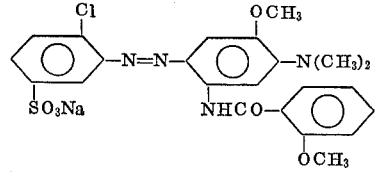

Bright red shades of excellent levelness and fastness to light are obtained when this dye is applied to BCF nylon by the procedure described in Example 16.

EXAMPLES 3–15

The following examples were carried out by methods similar to those described in Examples 1 and 2; the dyes produced exhibited bright, level shades of fair to excellent light-fastness on BCF nylon when applied by the procedure of Example 16. The column headings are as previously defined; the numbers given under A, B and $SO_3Na$ indicate the position on the ring relative to the azo group.

TABLE 3

| Example | A | B | $SO_3Na$ | X | $R_1$ | $R_2$ |
|---|---|---|---|---|---|---|
| 3 | H | H | 3— | H | $C_3H_7$ | $C_6H_5$ |
| 4 | H | H | 4— | H | $CH_3$ | $C_6H_5$ |
| 5 | 2—$CH_3$ | H | 4— | H | $CH_3$ | $C_6H_5$ |
| 6 | 2—$OCH_3$ | H | 5— | H | $CH_3$ | $C_6H_5$ |
| 7 | 4—$CH_3CONH$ | H | 2— | H | $CH_3$ | $C_6H_5$ |
| 8 | 4—$C_6H_5CONH$ | H | 2— | H | $CH_3$ | $C_6H_5$ |
| 9 | 2—Cl | H | 5— | $OCH_3$ | $CH_3$ | $C_6H_5$ |
| 10 | H | H | 3— | H | $CH_3$ | $CH_3$ |
| 11 | 5—Cl | 4—$CH_3$ | 2— | H | $C_2H_5$ | $C_6H_5$ |
| 12 | 2—$CH_3$ | 4—$CH_3$ | 6— | H | $CH_3$ | —⟨C₆H₄⟩—Cl |
| 13 | H | H | 4— | $OC_2H_5$ | $CH_3$ | —⟨C₆H₄⟩—CH₃ |
| 14 | 2—Cl | H | 5— | H | $C_4H_9$ | $C_4H_9$ |
| 15 | 2—Cl | 5—Cl | 4— | H | $CH_3$ | $C_6H_5$ |

EXAMPLE 16

Aqueous dyeing procedure

In this example the nylon substrate is BCF carpeting made by tufting nylon yarn onto a non-woven polypropylene backing. The BCF nylon yarn is 3700-denier, 204-continuous filaments, trilobal, jet-bulked yarn, melt-spun from poly(hexamethylene adipamide) flake.

Thirty parts of the carpeting were scoured for 20–30 minutes at 180° F. in 1000 parts of water containing 0.2 part of the condensation product of 20 moles of ethylene oxide with 1 mole of $C_{18}$ alcohol, 0.6 part of concentrated ammonium hydroxide, and 0.15 part of sodium hydroxide. The carpeting was rinsed thoroughly in water. The carpeting was then added to a dye-bath consisting of 1000 parts of water containing 0.85 part of dodecyldiphenyl ether disulfonic acid disodium salt, 0.03 part of acid dye prepared by any of the above examples, 0.5 part of the condensation product of 10 moles of $C_{18}$ alcohol, and 0.6 part of monosodium phosphate. The pH was adjusted to 6.0 by adding acetic acid or disodium phosphate, as necessary. The dyebath temperature was raised to 210° F. over 45 minutes and dyeing was continued for 1 hour. The bath was then dropped and the carpeting was given a warm water rinse.

Evaluation of the dyes that were applied to BCF nylon carpeting by the procedure of Example 16 is given in Table 4 below. Exhaust was judged by the amount of color remaining in the dyebath on completion of the dyeing procedure. Transfer was evaluated by repeating the dyeing procedure but replacing the acid dye with a piece of dyed BCF nylon carpeting of equal weight to the undyed carpeting. In the ideal case, where the dyed and the undyed carpeting become dyed to equal depth, the transfer is 50%, since this amount of dye has transferred from the originally dyed to the originally undyed piece of carpeting. A transfer of 40% or better is usually required to achieve commercially acceptable level dyeing on a 15 foot wide nylon carpet.

Lightfastness was judged according to the method of the American Association of Textile Chemists and Colorists, using the International Gray Scale, after 80 hours exposure in a Xenon Arc Fade-O-meter:

5=negligible or no change
4=slight change
3=noticeable change
2=considerable change
1=much change
W=weaker
Y=yellower
D=duller.

TABLE 4

| Dye, Example No. | Shade | Exhaust | Transfer, (percent) | Lightfastness (80 hours Xenon) |
|---|---|---|---|---|
| 1 | Orange | Good | 40-50 | 5-4WYD |
| 2 | Red | do | 40 | 5-4W |
| 4 | Orange | do | 40-50 | 5 |
| 5 | do | do | 40-50 | 5 |
| 6 | do | do | 40 | 5-4W |
| 7 | do | Fair | 40 | 5-4W |
| 8 | do | Excellent | 45-50 | 3W |
| 9 | Red | Good | 40 | 3W |
| 10 | Orange | do | 40-50 | 2W |
| 11 | do | do | 30-35 | 4W |
| 15 | do | Excellent | 25-30 | 5-4W |

The embodiments of the invention in which an exclusive property or privilege is claimed are defined as follows:

1. Orange to red monoazo acid dye having the formula

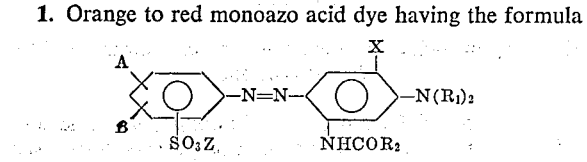

wherein A is H, Cl, methyl, methoxy, NHCOalkyl, NHCOphenyl or NHCOphenyl containing one substituent selected from methyl, methoxy and Cl;

B is H, Cl or methyl;
Z is H, a monovalent alkali metal, ammonium or ammonium substituted with lower alkyl or hydroxy lower alkyl;
X is H or alkoxy;
$R_1$ is alkyl; and
$R_2$ is alkyl, phenyl or phenyl containing one substituent selected from methyl, methoxy and Cl; said alkyl and alkoxy groups containing one to four carbon atoms.

2. The dye of claim 1 having the formula

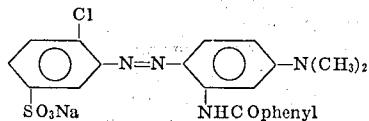

3. The dye of claim 1 having the formula

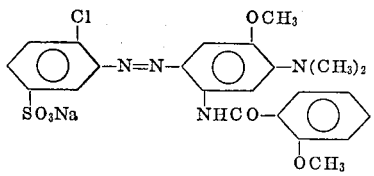

References Cited
UNITED STATES PATENTS 3,359,256   12/1967   Mueller et al. ____ 260—207.1 X JOSEPH REBOLD, Primary Examiner
C. F. WARREN, Assistant Examiner U.S. Cl. X.R.
8—41 B; 260—207.1, 505 R, 507 R, 512 R